J. BUTERA.
GRATING MACHINE.
APPLICATION FILED MAY 29, 1916.
1,199,874.
Patented Oct. 3, 1916.
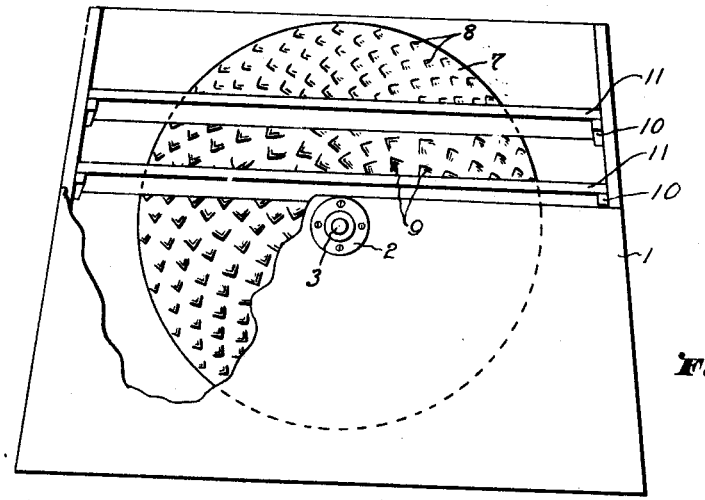
Fig. 1.
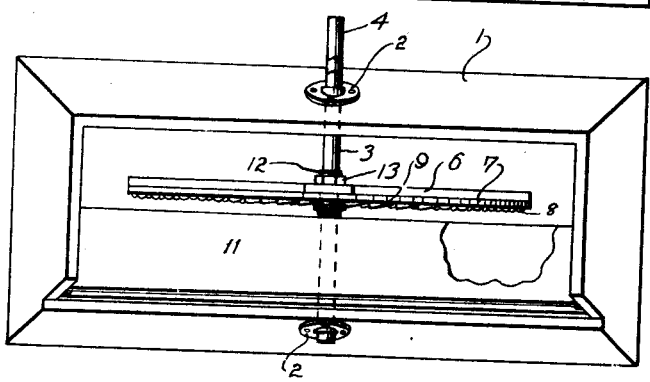
Fig. 2.
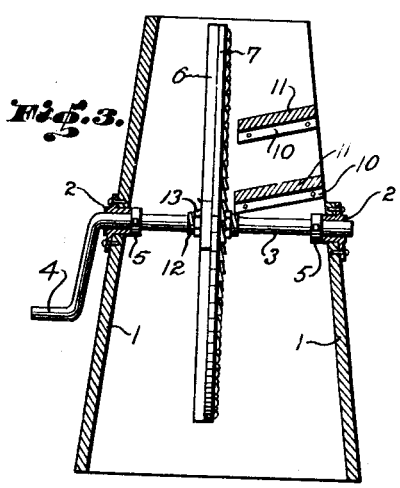
Fig. 3.
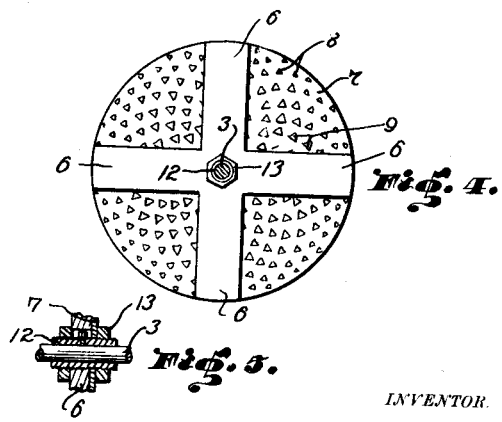
Fig. 4.
Fig. 5.
INVENTOR.
J. Butera
BY
John M. Spellman
ATTORNEY.

UNITED STATES PATENT OFFICE.

JOHN BUTERA, OF DALLAS, TEXAS.

GRATING-MACHINE.

1,199,874.  Specification of Letters Patent.  Patented Oct. 3, 1916.

Application filed May 29, 1916. Serial No. 100,648.

*To all whom it may concern:*

Be it known that I, JOHN BUTERA, a citizen of the United States, residing at Dallas, in the county of Dallas and State of Texas, have invented certain new and useful Improvements in Grating-Machines, of which the following is a specification.

My invention has relation to a grating machine for cheese, vegetables or similar culinary articles and in such connection it relates more particularly to the arrangement and construction of the parts consituting such a machine.

The main object of my present invention is to provide a grater for cheese, vegetables or similar culinary articles comprising a grater disk, revolving in a hopper-like frame which is open at the bottom and in connection with such arrangement the disk is provided with teeth or fins of fineness or coarseness varying from the center of the disk toward its periphery and the hopper is provided with a plurality of supports arranged to constitute a means for presenting the article to be grated to either the finer or the coarser teeth of the disk.

The nature and scope of my invention will be more fully understood from the following description taken in connection with the accompanying drawings, forming part hereof, in which—

Figure 1, is a front elevational view, partly broken away, of a grater embodying the main features of my invention. Fig. 2, is a top or plan view of the same. Fig. 3, is an end elevational view of the grater disk with the hopper or frame shown in cross-section. Fig. 4, is a rear view of the grater disk, and Fig. 5, is a detail sectional view illustrating the connection between the grater disk and the operating shaft.

Referring to the drawings 1 represents the frame of the grater constituting a hopper preferably open at both bottom and top.
In general use the frame 1 forms a hopper of truncated pyramidal form. Through bearings 2 in the inclined sides of the hopper is inserted the shaft 3 having a handle 4. The two removable collars 5 serve to hold
the shaft in the bearing 2. On the shaft 3 is supported a spider or frame-work 6 to which the grater disk 7 is secured in any suitable manner. This disk 7 is provided with two series of V-shaped grater teeth 8 and 9 for relatively fine and relatively coarse grating. As shown in the drawings the teeth are punched in and project from the face of the disk and are arranged in spirals with the finer teeth 8 grouped nearest the periphery of the disk while the coarser teeth 9 are grouped near and around the center of said disk. However this arrangement or grouping may be reversed if desired.

The top of one inclined side of the hopper is cut away to form a space through which the cheese or article to be grated may be introduced against the grater disk 7. At the ends of the frame work 1 adjacent to this open space are secured the cleats 10 arranged in pairs to support the removable boards or rests 11. The material to be grated into relatively fine particles is supported on the upper board or rest 11 during the grating operation, but when it is to be grated into relatively coarse particles the material is supported on the lower board or rest after the upper board or rest has been removed.

The preferred means for securing the spider or frame 6 to shaft 3 is illustrated in the detail in Fig. 5. It consists of a tube 12 removably secured to the shaft 3 and having screw threaded ends.

The spider 6 is clamped to this sleeve or tube 12 by means of the nuts 13 which are advanced on the screw threaded sleeves to tightly clamp the spider to the sleeve.

Having thus described the nature and objects of my invention what I claim as new and desire to secure by Letters Patent, is—

1. In a device of the character described, a revoluble grater disk having grating fins of V-shape and punched in and projecting from its face in spirals, said fins varying in size and arranged in concentric sets whereof one set is grouped about the center of the disk and the other adjacent to the periphery thereof.

2. In a device of the character described, a revoluble grater disk having grating fins punched in and projecting from its face in spirals to form two concentric sets of varying size and fineness, one set grouped about the center of the disk and the other adjacent to the periphery thereof, combined with a hopper wherein said disk revolves and superposed boards detachably supported at varying points in said hopper adjacent to the disk to constitute supports for the articles to be grated.

In testimony whereof I have signed my name to this specification.

JOHN BUTERA.